United States Patent [19]

Ashkin et al.

[11] Patent Number: 4,910,655

[45] Date of Patent: Mar. 20, 1990

[54] APPARATUS FOR TRANSFERRING SIGNALS AND DATA UNDER THE CONTROL OF A HOST COMPUTER

[75] Inventors: Peter B. Ashkin, Los Gatos; Michael Clark, Glendale, both of Calif.

[73] Assignee: Apple Computer, Inc., Cupertino, Calif.

[21] Appl. No.: 765,396

[22] Filed: Aug. 14, 1985

[51] Int. Cl.[4] ............... G06F 13/42; G06F 13/14
[52] U.S. Cl. ................... 364/200; 364/222.2; 364/242.92; 364/260.1; 364/261.2; 364/284.3; 371/57.2; 340/825.07; 340/825.52
[58] Field of Search ... 364/200 MS File, 900 MS File, 364/514; 371/22, 57; 340/825.50, 825.52, 825.51, 825.53, 825.07, 825.06; 370/85, 94; 375/55

[56] References Cited

U.S. PATENT DOCUMENTS

| | | | |
|---|---|---|---|
| 3,221,307 | 11/1965 | Manning | 364/200 |
| 3,646,534 | 2/1972 | Miller | 360/40 |
| 3,715,725 | 2/1973 | Kievit et al. | 364/200 |
| 3,787,627 | 1/1974 | Abramson et al. | 370/67 |
| 3,836,888 | 9/1974 | Boenke et al. | 364/200 |
| 3,863,025 | 1/1975 | Gonsewski et al. | 375/55 |
| 3,979,723 | 9/1976 | Hughes et al. | 370/31 |
| 4,063,220 | 12/1977 | Metcalfe et al. | 340/825.5 |
| 4,071,908 | 1/1978 | Brophy et al. | 364/900 |
| 4,345,250 | 8/1982 | Jacobsthal | 371/57 |
| 4,360,870 | 11/1982 | McVey | 364/200 |
| 4,373,181 | 2/1983 | Chisholm et al. | 364/200 |
| 4,442,502 | 4/1984 | Friend et al. | 364/900 |
| 4,498,169 | 2/1985 | Rozmus | 340/825.5 |
| 4,562,535 | 12/1985 | Vincent et al. | 364/200 |
| 4,568,930 | 2/1986 | Livingston et al. | 340/825.52 |
| 4,570,220 | 2/1986 | Tetrick et al. | 364/200 |
| 4,589,063 | 5/1986 | Shah et al. | 364/200 |
| 4,595,921 | 6/1986 | Wang et al. | 340/825.08 |
| 4,608,559 | 8/1986 | Friedman et al. | 340/825.5 |
| 4,608,689 | 8/1986 | Sato | 364/200 X |
| 4,611,274 | 9/1986 | Machino et al. | 364/200 |
| 4,620,278 | 10/1986 | Ellsworth et al. | 364/200 |
| 4,626,846 | 12/1986 | Parker et al. | 340/825.52 |
| 4,628,478 | 12/1986 | Henderson, Jr. | 364/900 |
| 4,638,313 | 1/1987 | Sherwood, Jr. et al. | 340/825.52 |
| 4,660,141 | 4/1987 | Ceccon et al. | 364/200 |
| 4,667,193 | 5/1987 | Cotie et al. | 340/825.08 |
| 4,675,813 | 6/1987 | Locke | 364/200 |
| 4,677,613 | 6/1987 | Salmond et al. | 370/85 |
| 4,701,878 | 10/1987 | Gunket et al. | 364/900 |
| 4,710,893 | 12/1987 | McCutchean et al. | 364/900 |
| 4,716,410 | 12/1987 | Nozaki | 340/825.52 |
| 4,760,553 | 7/1988 | Buckley et al. | 364/900 |
| 4,773,005 | 9/1988 | Sullivan | 364/200 |
| 4,775,931 | 10/1988 | Dickie et al. | 364/200 |

FOREIGN PATENT DOCUMENTS

| | | |
|---|---|---|
| 0051425 | 8/1982 | European Pat. Off. . |
| 0104545 | 4/1984 | European Pat. Off. . |
| 59-52331 | 3/1984 | Japan . |
| 1508854 | 4/1978 | United Kingdom . |
| 1518565 | 7/1978 | United Kingdom . |
| 2035636 | 6/1980 | United Kingdom . |
| 2070826 | 5/1984 | United Kingdom . |

OTHER PUBLICATIONS

Hill et al., "Dynamic Device Address Assignment Mechanism", IBM Technical Disclosure Bulletin, vol. 23, No. 8, Jan. 1981, pp. 3564–3565.

*Primary Examiner*—Thomas C. Lee
*Attorney, Agent, or Firm*—Blakely, Sokoloff, Taylor & Zafman

[57] ABSTRACT

A communications medium for transmitting data between a plurality of peripheral devices and a host computer. Only one device may talk on the bus at a time and only in response to a command from the host. When a peripheral device needs to be serviced, it sends out a service request signal by holding the bus low after any command signal. The device continues to request service until it receives a talk command from the host computer. When more than one device are the same type (for example, two mice) are coupled to the bus, the host computer assigns new addresses to the devices. Devices detect collisions by sensing a low signal on the bus when they attempt to send a "1".

17 Claims, 4 Drawing Sheets

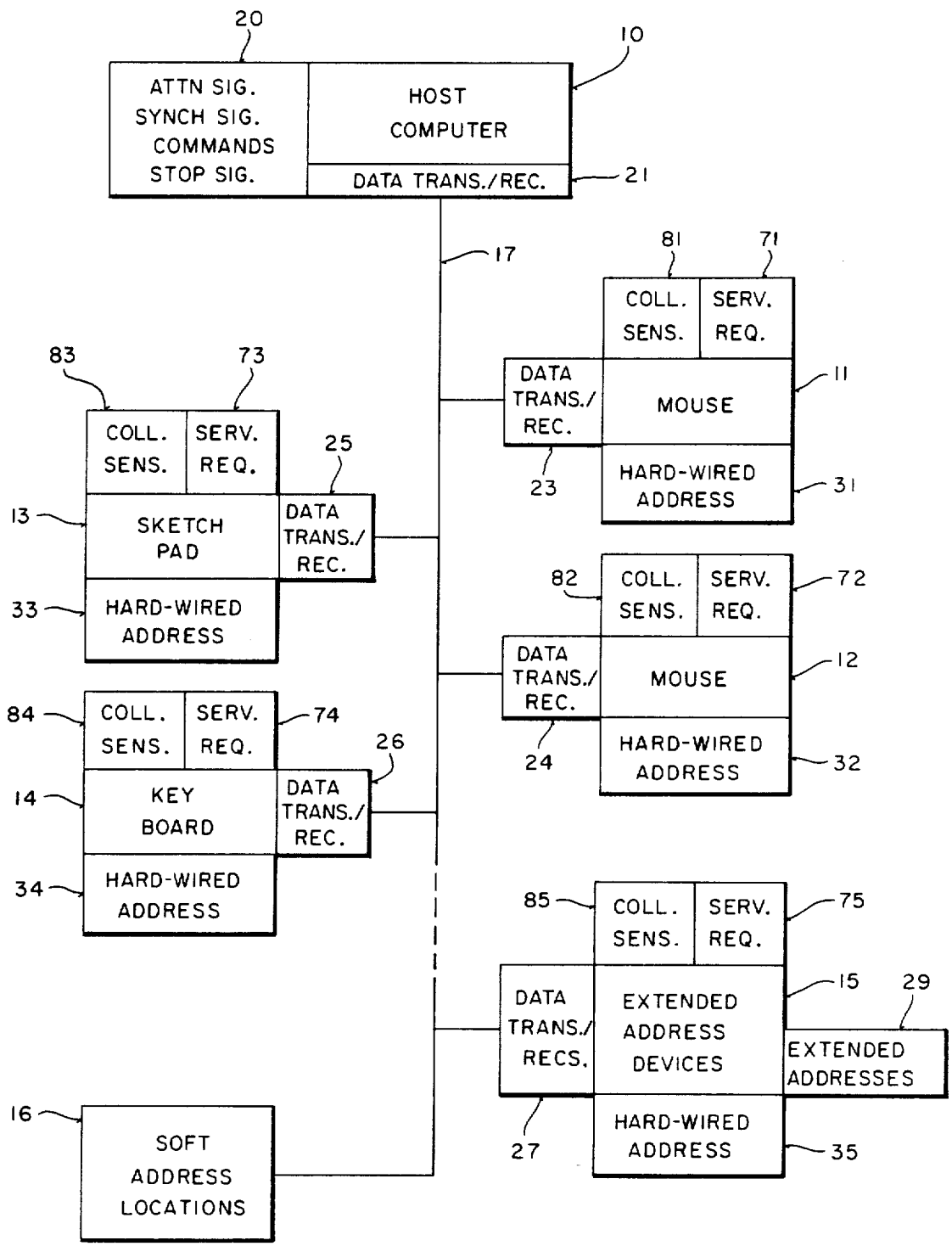

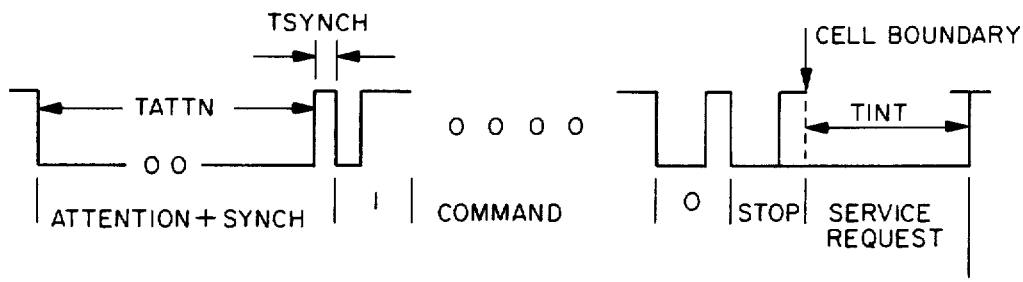
FIG_6
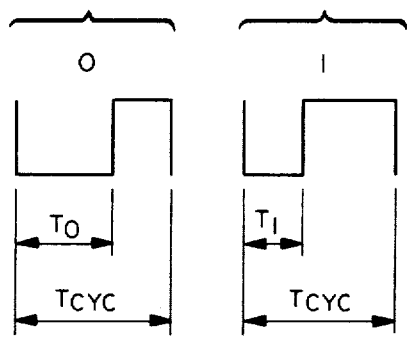
FIG_2
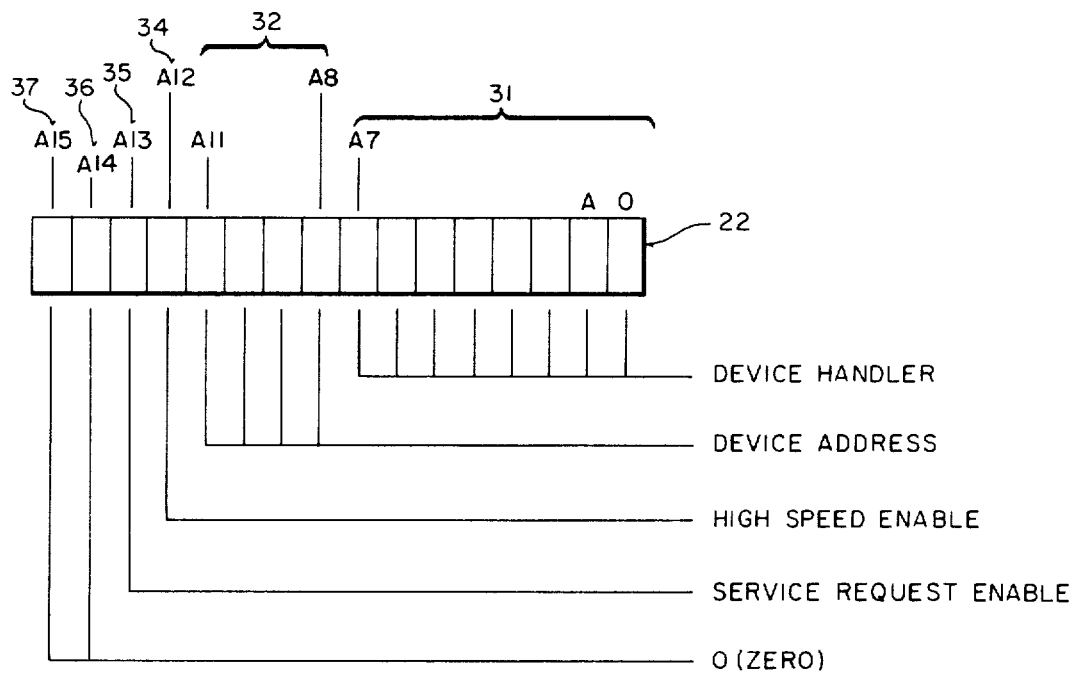
FIG_3

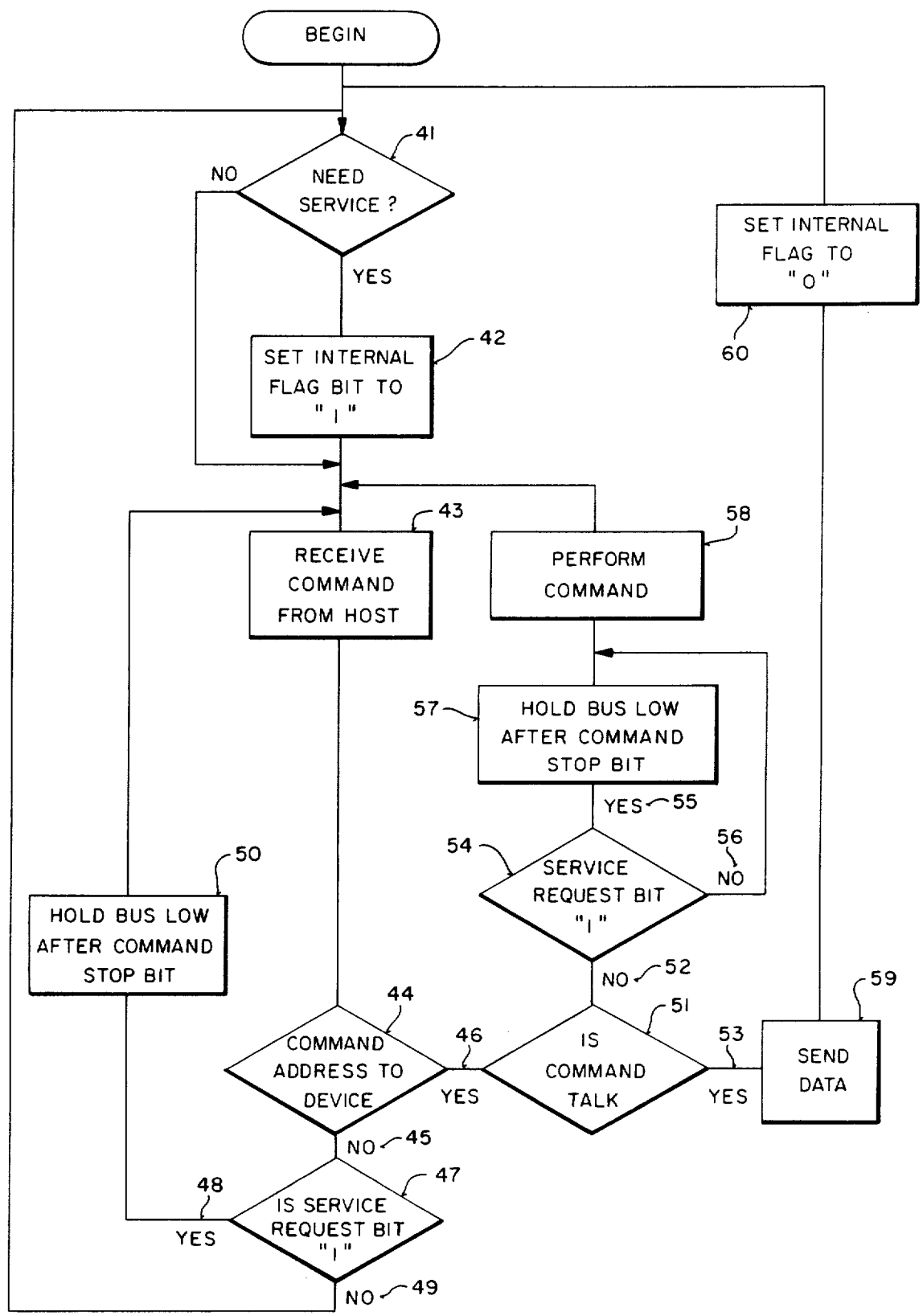

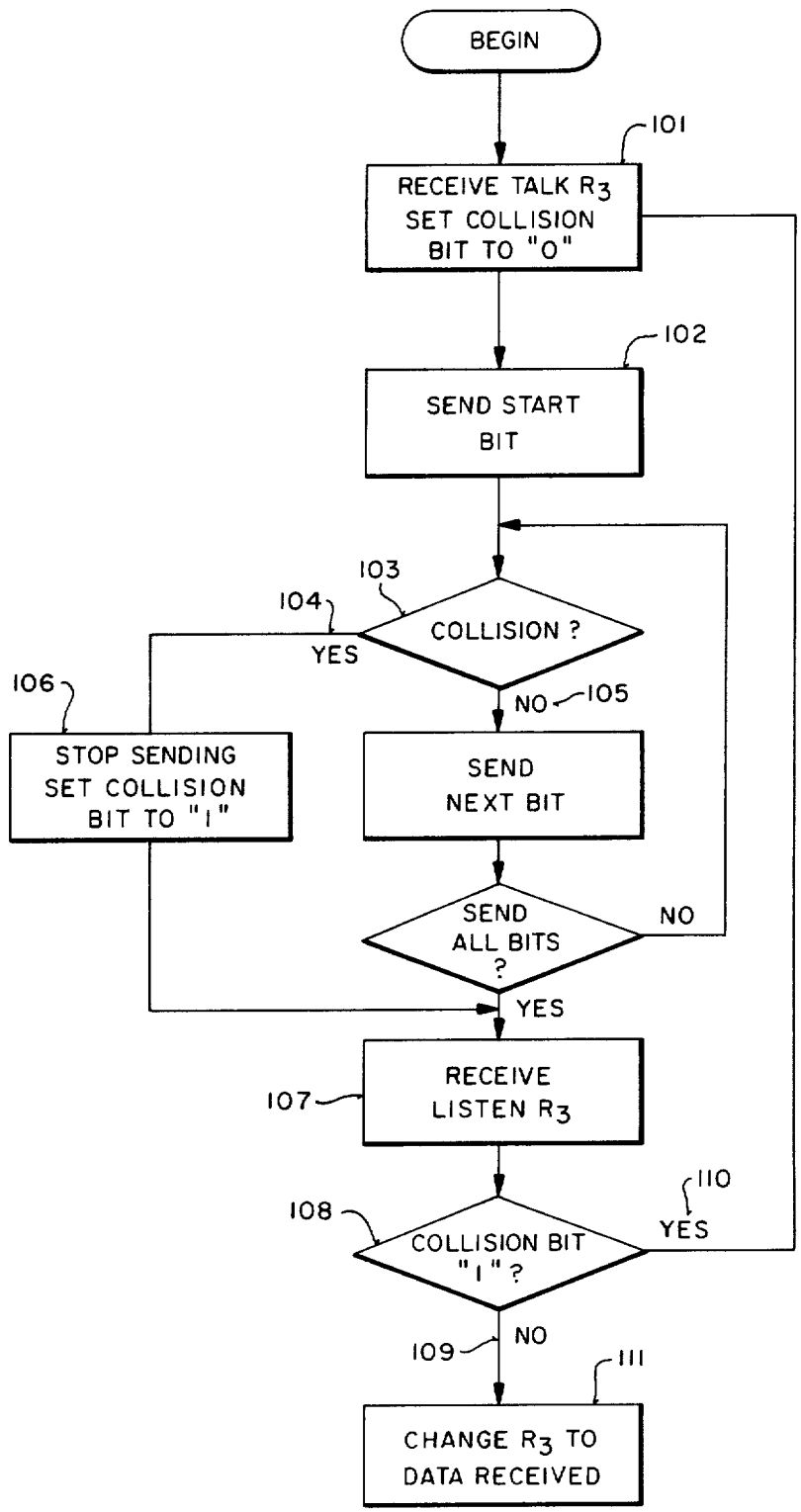
FIG_5

APPARATUS FOR TRANSFERRING SIGNALS AND DATA UNDER THE CONTROL OF A HOST COMPUTER

BACKGROUND OF THE INVENTION

1. Field of the Invention

This invention relates the field of communications media for transferring data between a source and a plurality of peripheral devices coupled to the source. More particularly, the present invention relates to data transfer along a peripheral device bus between a plurality of peripheral devices and a host computer.

2. Art Background

In the computing industry, it is quite common to transfer data and commands between a plurality of data processing devices, such as, for example, computers, printers, memories and the like. The interconnection of computers and other peripheral devices principally developed in the early 1970's with the advent of computer networking systems, which permitted the distribution of access to computing resources beyond the immediate proximity of a main frame computer.

Networks, such as the ARPA network, were developed to provide access by various users to large time-sharing systems and the transfer of data between such systems. In the case of geographically local networks, so-called "local area networks" (LANs) were developed to connect together a collection of computers, terminals and peripherals located, typically in the same building or adjacent buildings, and permitted each of these devices to communicate among themselves or with devices attached to other networks. Local area networks permit the implementation of distributed computing. In other words, some of the devices coupled to the local area network may be dedicated to perform specific functions, such as file storage, data base management, terminal handling, and so on. By having different machines perform different tasks, distributed computing can make the implementation of the system simplier and more efficient.

Presently, networking has only been applied to provide communications between data processing devices, which are machine input devices. However, it would also be useful to provide a networking means to provide communication between a single computer and a plurality of peripheral devices such as human input devices, listen only devices, appliances, etc. Human input devies include keyboards, cursor control devices (such as a "mouse"), and sketch pads, etc. Listen only devices include transaction logs, etc. In the prior art, such devices are attached to a host computer through a port dedicated to each device. Often, additional "cards" are required to allow a peripheral input device to be added. Further, the addition of cards requires that the host computer be powered down, with no mechanism for adding peripheral devices to a live system. Such prior art systems are inefficient since peripheral devices are not generally operated simultaneously. (for example, someone using a mouse is generally not using the keyboard or sketchpad at the same time). Thus, the devices could share a common line to the host computer without creating data traffic problems, eliminating the need for cards.

Prior art networking schemes also include elaborate methods for establishing control of the network to allow a device to transmit. Such systems are not needed for networking of peripheral devices, since only one is generally used at a time. In addition, prior art networking schemes provide for means for attached devices to identify themselves to each other through elaborate "handshaking" schemes. Again, such complexity is not required to connect peripheral devices since there is no need for these devices to identify themselves to other devices, only to the host computer.

Therefore, it is an object of the present invention to provide a communications medium for a plurality of peripheral devices, which provides a simple and efficient means for coupling those devices to a host computer.

It is a further object of the present invention to provide a communications medium by which all such peripheral devices can be coupled to a host computer at a single input.

It is still another object of the present invention to provide a communications medium which provides a means for peripheral devices to indicate a need for servicing to the host computer.

It is yet another object of the present invention to provide a communications medium which provides a means for determining if the communications medium is in use.

It is another object of the present invention to provide a communications medium which allows peripheral devices to be added during operation of the system.

SUMMARY OF THE INVENTION

A communications medium is disclosed including apparatus and methods for transferring data between a plurality of peripheral devices and a host computer. In the preferred embodiment, a plurality of peripheral devices such as human input devices (including mice, keyboards, sketchpads, etc.), appliances, listen only devices, etc., are coupled to a common cable for data transmission and reception of commands. A peripheral device coupled to the cable may signal the host computer when it requires servicing. This peripheral device will continue to request serivce until the host computer commands it to transmit its data. All peripheral devices of the same generic type (e.g., all keyboards), may have an identical hard wired address used as an indentifcation number. In this manner, the host computer can identify the generic type of device communicating on the cable. If more than one of the same type of device is coupled to the cable (e.g., 2 mice), the host computer will assign new addresses in the status registers of the mice so they can be differentiated.

In the preferred embodiment, a return to zero modulation scheme is used to transmit data and commands over the cable. As a result, a peripheral device will assume a collision if it attempts to transmit a high signal on the cable and the cable is pulled low by another device. In order to simplify the protocol of the system, only the computer can initiate communication.

The present invention permits the addition of peripheral devices to a computer while the computer is in use, without the need to power down the computer system. The present invention can be embodied in a narrow band medium, as well as broad band, fiber optic, infrared and other media.

BRIEF DESCRIPTION OF THE DRAWINGS

FIG. 1 is block diagram illustrating the networking system of the present invention.

FIG. 2 is a timing diagram illustrating the present invention's use of return to zero encoding.

FIG. 3 illustrates a register of a peripheral device of the present invention.

FIG. 4 is a flow chart illustrating the sequence of operations utilized by a peripheral device to request service by the host computer.

FIG. 5 is a flow chart illustrating the sequence the operations utilized to provide new addresses to devices sharing the same hard-wired address.

FIG. 6 is a timing diagram illustrating a command transaction of the present invention.

DETAILED DESCRIPTION OF THE INVENTION

A peripheral device bus including apparatus and methods for transferring data between a plurality of peripheral devices coupled to a host computer is disclosed. In the following description numerous specific details are set forth, such as specific numbers, registers, addresses, times, signals, and formats, etc., in order to provide a thorough understanding of the present invention. However, it will be apparent to one skilled in the art that the present invention may be practiced without these specific details. In other instances, well-known circuits and devices are shown in block diagram form in order not to unnecessarily obscure the present invention.

Referring to FIG. 1, the preferred embodiment of the present invention may be seen. A plurality of peripheral devices, generally identified by numbers 11 through 16 are coupled through a single cable 7 to a host computer 10. In the preferred embodiment, all devices communicate with the host computer by a mini-phono jack with the following connector assignments; tip-power, ring-data, sleeve-power return. A "high" signal (1) is 2.4 volts minimum. A "low" signal (0) is 0.8 volts maximum. Although a single cable is contemplated in the preferred embodiment of the present invention, other communications media, such as broad band methods, fiber optic systems, and infrared signals, are contemplated.

The bus of the present invention supports coded devices (for which a keystroke represents a symbol or a function, such as a keyboard 14), relative devices (in which movement of a display cursor in response to a control device, such as a mouse 11 or 12, may be from any starting point), and absolute devices (for which there is a constant and direct relationship between display position and device position, such as sketch pad 13).

The system also permits the networking of extended address devices. Extended address devices share a common hard wired address 35, but further include an address unique to the individual device which the host computer must recognize before the device can be accessed. Extended addresses 29 for respective extended address devices 15 are shown collectively in FIG. 1 by a single block diagram 29 coupled to extended address devices 15. For example, it is contemplated that appliances may be coupled to the host computer and controlled by the host computer. In such a situation, all appliances would have an identical hardwired fixed address. The host computer, on a first level, would simple address the hard wired address for appliances. At this time, all appliances coupled to that address are inactive. An individual appliance may be activated by the host computer if the host computer sends a signal to that appliance which matches the extended address of the appliance. An extended address is an individual identification number, which, in the preferred embodiment, may be up to 64 bytes long. Once the host computer has provided the extended address, the device having that address is active. Subsequent commands to the appliance address location will be executed by that device without the need for providing the extended address each time. An activated appliance will respond to all commands to the appliance address, while unactivated devices remain passive. To deactivate an active extended address device, the host computer provides the extended address of another extended address device, activating it and deactivating the previously active device. It is contemplated that any device which could be controlled by the host computer is suitable for the present networking scheme, such as lights, ovens, sprinkler systems, phone answering machines, etc. It is contemplated that at least one other hardwired address for extended address devices be provided in the present system. Such an address would be used for system protection schemes or user identification schemes. For example, a device at this location could contain an extended address which must be provided by the system user before the system could be enabled. In other instances, individual operations could require that the extended address of other security devices be provided by the host computer prior to performance. Such security devices could function as "keys" to lock the entire system or certain operations performed on the system.

Also reserved for use on the network of the present invention are soft address locations 16. Soft address locations are reserved for duplicates of peripheral devices coupled to the bus. When more than one mouse is coupled to the bus, for example, the host computer assigns new addresses to each mouse, those addresses being at the soft address locations.

Although specific examples have been given for each type of device coupled to the bus, there may be more than one kind of each type of device with that address. For example, a sketch pad has been given as an absolute device but a touch screen would also be considered an absolute device and be assigned the same fixed command address as the sketch pad. In those situations, the host computer will assign new addresses from the soft address locations to each device.

In the preferred embodiment of the present invention, the various peripheral devices have been assigned addresses as shown below:

| Address | Device Types | Example |
|---|---|---|
| 0000 (zero) | extended address device | security systems, user ID |
| 0001 (one) | extended address device | appliances |
| 0010 (two) | coded devices | keyboard |
| 0011 (three) | relative devices | mouse, track ball |
| 0100 (four) | absolute devices | sketchpad, touch screen |
| 0101 (five) | reserved | none |
| 0110 (six) | reserved | none |
| 0111 (seven) | reserved | none |
| 1000 (eight) | soft addressed | duplicate peripheral devices |
| . . . | . . . | . . . |
| . . . | . . . | . . . |
| 1111 (15) | soft addressed | duplicate peripheral devices |

It will appreciated by one skilled in the art that other addresses may be assigned to these devices containing more or less bits than in the preferred embodiment. Fixed hart-wired addresses 31, 32, 33 and 34 are shown in FIG. 1 for mouse 11, mouse 12, sketch pad 13, and keyboard 14, respectively.

In FIG. 1, data transmitter/receiver circuit 23 for mouse 11 is shown in block diagram form coupled to mouse 11. Data transmitter/receiver circuit 24 for mouse 12 is shown in block diagram form coupled to mouse 12. Data transmitter/receiver circuit 25 for sketch pad 13 is shown in block diagram form coupled to sketch pad 13. Data transmitter/receiver circuit 26 for keyboard 14 is shown in block diagram form coupled to keyboard 14. Data transmitter/receiver circuits 27 for respective extended address devices 15 are shown collectively in FIG. 1 by a single block diagram 27 coupled to extended address devices 15.

All peripheral devices have four registers in the preferred embodiment to receive data and send data. For each device, register 3 talk and register 3 listen have status information such as device address and handler information. The remaining registers are data registers which are device specific except register 2 listen which contains the extended addresses for extended address devices or device specific contents for soft addressed devices.

In the preferred embodiment of the present invention, there are three types of communication on the peripheral bus: commands, data and global signals. Commands are sent from the host computer to the peripheral devices, data is sent from the host computer to the devices or from the devices to the host computer, and global signals are special messages sent to the entire system.

In the preferred embodiment data is encoded as the ratio of low time to high time of each bit cell. A bit cell boundary is defined by a falling edge on the bus. A "zero" is encoded as a bit cell in which the low time is greater than the high time. This is shown in FIG. 2 by bit cell 20. Therefore, a "1" is defined as a bit cell in which the low time is less that the high time as shown by cell 21 of FIG. 2. In the present preferred embodiment, a start bit is defined as a "1". A stop bit is a "0" which does not have an additional falling edge to define the bit cell time. The stop bit is used to synchronize the stopping of transactions on the bus.

The period for each bit cell of command signals and low speed data transmission is approximately 100 microseconds plus or minus 30%. For high speed data transmission, the bit cell is 50 microseconds plus or minus 1%. The format of a data transaction is a start bit (1), followed by up to 256 bits of data and ending with a stop bit. It will be appreciated that when other communications media are utilized, other signaling methods may be utilized.

Commands are sent only by the host. In the preferred embodiment of the present invention, there are three commands; talk, listen, and flush. As shown in FIG. 6, to signal the start of a command, an attention pulse is sent out. An attention pulse is generated by the host computer by transmitting a bus low for a period of "T-attn". In the preferred embodiment, T-attn is approximately 560-1040 microseconds. The attention pulse is followed by a synch pulse to give the initial bus timing. The following edge of the synch pulse is used as a timing reference for the first bit of the command. The command is followed by a stop bit, (in the preferred embodiment a "0"). After the stop bit, the bus returns to its normally high state unless a device requests service.

The command is an 8 bit value in the preferred embodiment. The command includes a 4 bit device address field which specifies the fixed hardwired address of the desired peripheral device (e.g., 0011 for a mouse). The next 2 bits form the command and the final 2 bits form a register address field which allows a specific register, R0-R3 within an addressed peripheral device to be specified. In the preferred embodiment, the commands have the following bit code:

| Command | Code |
|---------|------|
| Flush   | 01   |
| Listen  | 10   |
| Talk    | 11   |

The talk command orders the addressed device to provide its data to the host computer. The listen command orders the addressed device to accept data from the host computer and place it in one of its registers. The flush command has an effect on each device which is defined by the individual device. It can be used for such functions as clearing a register or resetting all keys on a keyboard so that they will be sent again. Generator 20 for generating the attention signal, the synchronization signal, the commands, and the stop signal is shown in FIG. 1 coupled to host computer 10. In FIG. 1, circuitry 21 for transmitting data from host computer 10 and receiving data from the peripheral devices is shown in block diagram form coupled to host computer 10.

When a peripheral devices is addressed to talk, it must respond within a certain period, called the "time out" period. The time out, "Tlt", is approximately 140 to 260 microseconds (2 bit cells). The selected device, if it does not time out, becomes active on the bus and performs its data transaction, and then "untalks" itself and goes inactive on the bus.

Global signals are used for transactions which are neither commands nor data transactions. Global signals include: attention and synch, which is used to signal the start of a command and to give initial bus timing; service request, a transaction that devices use to signal the host that they require service; and reset, used to issue a break on the bus by holding the bus low for a minimum of "Tres", which is approximately 2.8 to 5.2 milliseconds, (40 bit cells). Global signals will be described in more detail in conjunction with other transactions.

Since a peripheral device can only send data when it has been commanded to talk by the host computer, the present system provides a means for a device to notify the host computer that it needs servicing. This is accomplished by having the device send a service request signal to the host computer. In the present invention, a service request is sent by holding the bus low after the stop bit of any command transaction. Each of the peripheral devices coupled to the bus include a number of registers (in the preferred embodiment four registers). FIG. 3 shows one of the registers for a peripheral device. Bit A13 has been identified as the service request enable bit. When this bit is set high by the host computer, the device is enabled to hold the bus low after the stop bit of a command transaction, as shown in FIG. 6, if the device needs service. A device will keep requesting service until it receives a talk command from the host. The flow chart in FIG. 4 shows the steps followed by a device requiring service.

Initially the device determines if it requires servicing, Block 41, that is, if it has data to send to the host. If it does, it sets an internal flag bit, Block 42. When the next command is sent out from the host, Block 43, the device checks to see if the command is addressed to the device, Block 44. If the command was not addressed to the device, Branch 45, the device checks to see if its service request enable bit, (bit A13 of register 3), is set high, Branch 47. If so, Branch 48, it holds the bus low after the command stop bit, Block 50. (See FIG. 6) The device then waits until the next command is received from the host to see if it will be addressed to talk, Block 43. If the command is addressed to the device, Branch 46, the device determines if it is a command to talk, Block 51. If it is not a command to talk, Branch 52, the device sends a service request, Block 57, performs whatever command is instructed, Block 58, and awaits the next command, Block 43. If the command is to talk, Branch 53, the device sends its data, Block 59, and considers its service request to be satisfied, Block 60. The device continues to monitor itself to determine when it needs service, Block 41. By allowing the host computer to control the service request enable bit, more efficient operation of the bus is realized. When a service request is received, the host computer need only ask those devices whose service request bit was enabled whether they need servicing. Additionally, the host computer can disable certain devices that are not required for particular applications.

In FIG. 1, service request signal generator 71 for mouse 11 is shown in block diagram form coupled to mouse 11. Service request signal generator 72 for mouse 12 is shown in block diagram form coupled to mouse 12. Service request signal generator 73 for sketch pad 13 is shown in block diagram form coupled to sketch pad 13. Service request signal generator 74 for keyboard 14 is shown in block diagram form coupled to keyboard 14. Service request signal generators 75 for respective extended address devices 15 are shown collectively in FIG. 1 by a single block diagram 27 coupled to extended address devices 15.

When sending data, the device is able to detect collisions.

In FIG. 1, collision sensing circuit 81 for mouse 11 is shown in block diagram form coupled to mouse 11. Collision sensing circuit 82 for mouse 12 is shown in block diagram form coupled to mouse 12. Collision sensing circuit 83 for sketch pad 13 is shown in block diagram form coupled to sketch pad 13. Collision sensing circuit 84 for keyboard 14 is shown in block diagram form coupled to keyboard 14. Collision sensing circuits 85 for resepective extended address devices 15 are shown collectively in FIG. 1 by a single block diagram 85 coupled to extended address devices 15. If a peripheral device tries to output a 1 and the data line is or goes to a 0, the device assumes it has lost a collision to another device. This means that another device is also sending on the bus. When this happens the losing device untalks itself from the bus and preserves the data which was being sent for retransmission. The device sets an internal flag bit if it loses a collision. Prior art peripheral devices were unable to detect collisons. This novel feature of the present invention permits more efficient operation of the communications medium. By having the device sense a collision, it can preserve the data that is transmitted and indicate to the host computer that it requires serving. Additionally, the collision detection scheme of the present invention does not require a waiting period before a collision is assumed. A device will end its transmission if the line is modulated by another device or simply not begin its transmission if the line is already in use. Further, this collision detection scheme is useful in locating multiple devices at a single hardwired address location, such as mouse 11 and mouse 12 of FIG. 1.

In such a situation, the host will change the address of the devices by forcing a collision of devices sharing the same address. The host achieves this by issuing a talk R3 command addressed to those devices. As shown in FIG. 3, Register 3 22 (one of the registers of the device) contains the following information. Bits A0 through A7 31 contain a device handler which tells the host computer the function of a device and the use of data provided by the device. Bits A8 through A11 32, are an address field which can be changed when more than one device, having the same command address, is coupled to the bus. In that situation, one of the soft address locations are assigned to bits A8 through A11 32 which then serve as the command address for that device. Until that time, those bit locations contain a random number which aids in the detection of collisions. For example, if two mice received a talk R3 command and both began talking at the same, neither would detect a collision. However, by having random numbers in the address field 32 of register 3 22, the output of the two devices will eventually differ. When that occurs, one of the devices will detect a collision and stop talking. Bit A12 34 is a high speed enable bit which if set, provides for data transmission at the higher modulation rate (50 microseconds per bit frame). The high speed enable bit is set by the host computer. If the host computer is unable to receive data at the higher modulation rate, it sets the high speed enable bit low in each of the devices. If the host computer is able to accept data at the higher modulation rate, and the device is able to transmit at the higher rate, (that information being contained in the handler bits 31 of register 3), the host computer sets the high speed enable bit 34 high for the device. As previously mentioned, bit A13 35 is service request enable which is set by the host to enable the device to perform a service request transaction. Bits A14 36 and A15 37 are reserved for future use and are set to 0.

When a device receives a talk R3 command the device provides its status (handler and address) to the host computer. If there are two devices of the same type coupled to the bus, only one can respond since the other will detect a collision. FIG. 5 shows the method of assigning new addresses on the bus.

After receiving a talk R3 signal, Block 101, the device sends its status from Register 3. If the line goes low, the device determines that there has been a collision, Branch 104, it stops sending (untalks itself) and sets an internal flag bit to indicate a collision, Block 106. The host sends a listen R3 to the mouse address, Block 107. Each talk commend resets the internal collision flag of the device. The device checks to see if its collision bit is set, Block 108. If the collision bit is not set, Branch 109, the device changes A8 through A11 to the soft address provided by the listen R3 command, Block 111. In this manner the address of the winning device is changed with the host computer keeping track of the new address of the device. If a collision bit is detected by the device after a listen R3 command, Branch 110, the device does not change the soft address bits, but may change other fields in R3. The host computer sends out another talk R3 command, Branch 101, to see if any devices remain at the mouse address. In this situation the remaining mouse will send its start bit, Block 102, not detect a collision, Branch 105, and send its status from register 3, Block 112. The host computer will send back a listen R3 command to the mouse address, Block 107. The remaining mouse will not detect a collision bit being set in this instance, Branch 109, so it will change bits A8 through A11 of register 3 to the soft address received from the host computer, Block 111. The host computer then sends out another talk R3 command to the mouse address, Block 101. This time, since no mouse remains at that address, the bus is timed out and the host computer knows that it has assigned new addresses to each of the mice sharing the mouse address.

In one embodiment of the present invention, peripheral devices have a device on them to indicate activity called the activator. The activator can be a special key on a keyboard or a button on a mouse. When more than one of a device is coupled to the bus, the host computer can display a message requesting one of the devices to use the activator. The host can then issue a listen R3 command which will change the address of the device which is activated. In this manner individual devices can be located and assigned new addresses in multiuser applications.

Thus, a peripheral device bus has been described which allows a plurality of peripheral devices to be coupled to a host computer through a single port.

We claim:

1. An apparatus for transferring signals and data, wherein the signals and data are transferred under the control of a host computer from the host computer to first and second peripheral devices and from the first and second peripheral devices to the host computer, wherein the signals and data are transferred over a bus coupling the first and second peripheral devices to the host computer, and wherein the bus is normally in a logical first state, comprising:

means, coupled to the first peripheral device, containing a first hard-wired identification number as a first address of the first peripheral device;

means, coupled to the second peripheral device, containing a second hard-wired identification number as a first address of the second peripheral device;

means, coupled to the host computer, for generating a plurality of signals for transmission over the bus to at least one of the peripheral devices, wherein the plurality of signals comprise an attention signal, a synchronization signal, one of a plurality of commands, and a stop signal, wherein the plurality of signals allow the host computer to control at least one of the peripheral devices, and wherein each of the plurality of commands includes an address of at least one of the first and second peripheral devices to which the command is directed;

means, coupled to the first peripheral device, for generating a first service request signal for transmission to the host computer by holding the bus at a logical second state for a period of time after transmission of the stop signal, wherein the first service request signal indicates to the host computer that at least one of the peripheral devices has data to send to the host computer and requests a command from the host computer that would permit the peripheral device to transmit the data to the host computer, and wherein the transmission of the first service request signal is selectively enabled and disabled by the host computer;

means, coupled to the second peripheral device, for generating a second service request signal for transmission to the host computer by holding the bus at the logical second state for a period of time after transmission of the stop signal, wherein the second service request signal indicates to the host computer that at least one of the peripheral devices has data to send to the host computer and requests a command from the host computer that would permit the peripheral device to transmit the data to the host computer, and wherein the transmission of the service request signal is selectively enabled and disabled by the host computer;

means, coupled to the host computer, for transmitting data from the host computer to at least one of the peripheral devices over the bus;

means, coupled to the first peripheral device, for transmitting data over the bus to the host computer from the first peripheral device if and only if one of the plurality of commands received by the first peripheral device from the host computer is a command to transfer data from the first peripheral device to the host computer;

means, coupled to the second peripheral device, for transmitting data over the bus to the host computer from the second peripheral device if and only if one of the plurality of commands received by the second peripheral device is a command to transfer data from the second peripheral device to the host computer;

first collision sensing means, coupled to the first peripheral device, for setting a collision detect bit to the logical first state from the logical second state when the first peripheral device attempts to transmit data in the logical first state on the bus but the bus is in or goes to the logical second state, wherein the first peripheral device stops transmitting data after the collision detect bit is set to the logical first state, and wherein the first collision sensing means provides a control over access to the bus by the first peripheral device;

second collision sensing means, coupled to the second peripheral device, for setting a collision detect bit to the logical first state from the logical second state when the second peripheral device attempts to transmit data in the logical first state on the bus but the bus is in or goes to the logical second state, wherein the second peripheral device stops transmitting data after the collision detect bit is set to the logical first state, and wherein the second collision sensing means provides a control over access to the bus by the second peripheral device; and means, coupled to the host computer, for storing (1) a first number at a first soft address location and (2) a second number at a second soft address location, wherein if a collision is detected and is the result of the first hard-wired identification number being the same as the second hard-wired identification number, then the host computer (1) sends the first number stored at the first soft address location as data over the bus to the first peripheral device for storage by the first peripheral device as a second address of the first peripheral device and (2) sends the second number stored at the second soft address location as data over the bus to the second peripheral device for storage by the second peripheral device as a second address of the second peripheral device, wherein the first number is different from the second number.

2. The apparatus of claim 1 for transferring signals and data, wherein the first peripheral device includes a register for storing the first number as the second address of the first peripheral device, and the second peripheral device includes a register for storing the second number as the second address of the second peripheral device.

3. The apparatus of claim 2 for transferring signals and data, wherein the means for generating the first service request signal includes a first service request enable bit that can be selectively set by the host computer to the logical first state and the logical second state, wherein if the host computer sets the first service request enable bit to the logical first state, the means for generating the first service request signal is enabled to send the service request signal to the host computer, wherein if the host computer sets the first service request enable bit to the logical second state, the means for generating the first service request signal is disabled from sending the first service request signal to the host computer; and the means for generating the second service request signal includes a second service request enable bit that can be selectively set by the host computer to the logical first state and the logical second state, wherein if the host computer sets the second service request enable bit to the logical first state, the means for generating the second service request signal is enabled to send the serivce request signal to the host computer, wherein if the host computer sets the second service request enable bit to the logical second state, the means for generating the second service request signal is disabled from sending the second service request signal to the host computer.

4. The apparatus of claim 3 for transferring signals and data, wherein the means for transmitting data from the first peripheral device includes an internal flag bit that can be selectively set by the first peripheral device data transmitting means to the logical first state and the logical second state, wherein the first peripheral device data transmitting means sets the internal flag bit to the logical first state if the first peripheral device has data to send to the host computer, and wherein the first peripheral device data transmitting means sets the internal flag bit to the logical second state after the first peripheral device data transmitting means has sent the data to the host computer; and the means for transmitting data from the second peripheral device includes an internal flag bit that can be selectively set by the second peripheral device data transmitting means to the logical first state and the logical second state, wherein the second peripheral device data transmitting means sets the internal flag bit to the logical state if the second peripheral device has data to send to the host computer, and wherein the second peripheral device data transmitting means sets the internal flag bit to the logical second state after the second peripheral device data transmitting means has sent the data to the host computer.

5. The apparatus of claim 4 for transferring signals and data, wherein the logical first state is a logical high state and the logical second state is a logical low state.

6. The apparatus of claim 5 for transferring signals and data, wherein at least one of the first and second peripheral devices comprises a mouse.

7. The apparatus of claim 5 for transferring signals and data, wherein at least one of the first and second peripheral devices comprises a sketch pad.

8. The apparatus of claim 5 for transferring signals and data, wherein at least one of the first and second peripheral devices comprises a keyboard.

9. The apparatus of claim 5 for transferring signals and data, wherein the first and second collision sensing means each includes pulse detection circuitry for detecting that the signal on the bus is in a logical low state.

10. The apparatus of claim 9 for transferring signals and data, wherein the signals sent over the bus are in a return-to-zero encoding format.

11. The apparatus of claim 5 for transferring signals and data, wherein the plurality of commands comprise a talk command, a listen command, and a flush command.

12. The apparatus of claim 5 for transferring signals and data, wherein the means for transmitting data from the first peripheral device includes a first high speed enable bit that the host computer can selectively set to the logical first state and the logical second state, wherein if the first high speed enable bit is set to the logical first state, then the first peripheral device data transmitting means transmits data at a first modulation rate, wherein if the first high speed enable bit is set to the logical second state, then the first peripheral device data transmitting means transmits data at a second modulation rate; and the means for transmitting data from the second peripheral device includes a second high speed enable bit that the host computer can selectively set to the logical first state and the logical second state, wherein if the second high speed enable bit is set to the logical first state, then the second peripheral device data transmitting means transmits data at the first modulation rate, wherein if the second high speed enable bit is set to the logical second state, then the second peripheral device data transmitting means transmits data at the second modulation rate, wherein the first modulation rate is higher than the second modulation rate.

13. The apparatus of claim 12 for transferring signals and data, wherein the logical first state is a logical high state and the logical second state is a logical low state.

14. The apparatus of claim 2 for transferring signals and data, further comprising a third peripheral device coupled to the host computer by the bus, wherein the third peripheral device includes means that includes (1) a third hard-wired identification number as a first address of the third peripheral device and (2) a register for storing a third number as an extended address of the third peripheral device, wherein when the host computer sends over the bus the first address of the third peripheral device and a signal that matches the extended address of the third peripheral device, the third peripheral device is initially activated, and wherein when the host computer then sends over the bus a subsequent command to the first address of the third peripheral device, the command is executed by the third peripheral device without the host computer sending the extended address of the third peripheral device.

15. The apparatus of claim 14 for transferring signals and data, further comprising a fourth peripheral device coupled to the host computer by the bus, wherein the fourth peripheral device includes means that includes (1) the third hard-wired identification number as a first address of the fourth peripheral device and (2) a register for storing a fourth number as an extended address of the fourth peripheral device, wherein the fourth number is different from the third number, wherein when the host computer sends over the bus the extended address of the fourth peripheral device after the third peripheral device has been activated, the fourth peripheral device is initially activated and the third peripheral device is deactivated, and wherein when the host computer then sends over the bus a subsequent command to the first address of the fourth peripheral device, the command is executed by the fourth peripheral device without the host computer sending the extended address of the fourth peripheral device.

16. The apparatus of claim 15 for transferring signals and data, wherein at least one of the first and second peripheral devices comprises an appliance.

17. The apparatus of claim 15 for transferring signals and data, wherein at least one of the first and second peripheral devices comprises a system protection device.

* * * * *